(12) United States Patent
Breault et al.

(10) Patent No.: US 12,553,380 B2
(45) Date of Patent: Feb. 17, 2026

(54) CONSTANT SPEED ACCESSORY GEARBOX FOR TURBINE ENGINE

(71) Applicant: RTX CORPORATION, Farmington, CT (US)

(72) Inventors: Andrew E. Breault, Bolton, CT (US); Joseph T. Connors, Columbia, CT (US); John Hoult, Waterford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/421,616

(22) Filed: Jan. 24, 2024

(65) Prior Publication Data

US 2025/0237169 A1 Jul. 24, 2025

(51) Int. Cl.
| | |
|---|---|
| *F02C 3/113* | (2006.01) |
| *F01D 15/08* | (2006.01) |
| *F01D 15/10* | (2006.01) |
| *F02C 3/107* | (2006.01) |
| *F02C 7/14* | (2006.01) |
| *F02C 7/32* | (2006.01) |
| *F02C 7/36* | (2006.01) |
| *F02K 3/06* | (2006.01) |

(52) U.S. Cl.
CPC .............. *F02C 3/113* (2013.01); *F01D 15/08* (2013.01); *F01D 15/10* (2013.01); *F02C 3/107* (2013.01); *F02C 7/14* (2013.01); *F02C 7/32* (2013.01); *F02C 7/36* (2013.01); *F02K 3/06* (2013.01); *F05D 2260/4031* (2013.01)

(58) Field of Classification Search
CPC .. F02C 3/107; F02C 3/113; F02C 7/14; F02C 7/32; F02C 7/36
See application file for complete search history.

(56) References Cited

U.S. PATENT DOCUMENTS

| | | | |
|---|---|---|---|
| 8,297,039 B2 | 10/2012 | Scothern | |
| 8,966,876 B2 * | 3/2015 | Suciu | F02C 9/16 477/30 |
| 11,220,960 B2 * | 1/2022 | Leque | F02C 7/36 |
| 11,333,077 B2 * | 5/2022 | Foutch | F02C 7/36 |
| 2013/0098057 A1 | 4/2013 | Suciu et al. | |
| 2014/0309077 A1 * | 10/2014 | Heglund | F16H 3/52 475/311 |

(Continued)

FOREIGN PATENT DOCUMENTS

| | | |
|---|---|---|
| EP | 4239178 A1 | 9/2023 |
| JP | 5016706 B2 | 9/2012 |

OTHER PUBLICATIONS

Extended European Search Report for European Application No. 25153974.8 mailed Jun. 5, 2025.

*Primary Examiner* — Laert Dounis
(74) *Attorney, Agent, or Firm* — Carlson, Gaskey & Olds, P.C.

(57) ABSTRACT

An accessory drive system for a turbine engine includes a first input shaft that is coupled to a first engine drive shaft, a constant speed drive that is driven at an input speed by the first input shaft that varies, the constant speed drive includes an output that rotates at a constant speed independent of the input speed, an accessory gearbox that includes a first gear system that is driven by the output from the constant speed drive, and a first accessory component that is mounted to the accessory gearbox and driven by the gear system.

11 Claims, 5 Drawing Sheets

(56) References Cited

U.S. PATENT DOCUMENTS

| | | | |
|---|---|---|---|
| 2019/0039454 A1* | 2/2019 | Duong | F16D 13/24 |
| 2019/0218977 A1* | 7/2019 | Muldoon | F02C 7/32 |
| 2022/0195884 A1* | 6/2022 | Foutch | F02C 7/32 |
| 2022/0412268 A1 | 12/2022 | Greenberg et al. | |
| 2024/0003302 A1* | 1/2024 | Takami | F02C 7/32 |
| 2024/0084734 A1* | 3/2024 | Minelli | F02C 7/14 |

* cited by examiner

CONSTANT SPEED ACCESSORY GEARBOX FOR TURBINE ENGINE

TECHNICAL FIELD

The present disclosure relates generally to an accessory gearbox for a turbine engine. More particularly, to a system providing a constant speed drive input to the accessory gearbox for a turbine engine.

BACKGROUND

A turbine engine typically includes a fan section, a compressor section, a combustor section, and a turbine section. Accessory components such as generators and pumps are utilized to support engine operation. The accessory components are conventionally driven by an engine shaft through an accessory gearbox. Variations in engine shaft speed during engine operations are considered for each of the accessory components driven through the accessory gearbox. Variations in shaft speed can be significant and require compromises in the implementation of accessory component structures to accommodate extremes in shaft speed. Turbine engine manufacturers continue to seek further improvements to engine performance including improvements to thermal, transfer and propulsive efficiencies.

SUMMARY

An accessory drive system for a turbine engine according to an exemplary embodiment of this disclosure includes, among other possible things, a first input shaft that is coupled to a first engine drive shaft, a constant speed drive that is driven at an input speed by the first input shaft that varies, the constant speed drive includes an output that rotates at a constant speed independent of the input speed, an accessory gearbox that includes a first gear system that is driven by the output from the constant speed drive, and a first accessory component that is mounted to the accessory gearbox and driven by the gear system.

In a further embodiment of the foregoing, the accessory drive system further includes a controller that is programmed to operate the constant speed drive to provide the constant speed of the output.

In a further embodiment of any of the foregoing, the accessory drive system further includes a heat exchanger that transfers heat that is generated within the constant speed drive into a cooling flow.

In a further embodiment of any of the foregoing accessory drive systems, the first input shaft includes a first tower shaft and the first engine shaft includes an outer shaft of a high spool of the turbine engine.

In a further embodiment of any of the foregoing, the accessory drive system further includes a second tower shaft that is driven by an inner shaft of a low spool shaft of the turbine engine and an integrated gear system that is coupled to both the first tower shaft and the second tower shaft. The constant speed drive and the integrated gear system are combined into a single integrated gearbox that drives the output.

In a further embodiment of any of the foregoing accessory drive systems, the constant speed drive is mounted to the gearbox and drives the first gear system. The accessory gearbox includes a second gear system that is driven directly by the first input shaft and separate from the constant speed drive.

In a further embodiment of any of the foregoing, the accessory drive system further includes a second accessory component that is driven by the second gear system.

In a further embodiment of any of the foregoing, the accessory drive system further includes a starter that is mounted to the accessory gearbox and coupled to drive the input shaft through the second gear system.

In a further embodiment of any of the foregoing accessory drive systems, the first accessory component includes at least one of a lubrication pump, fuel pump, hydraulic fluid pump and a generator.

A turbine engine assembly according to another exemplary embodiment of this disclosure includes, among other possible things, a fan section that includes a plurality of blades that are rotatable about an axis, a high spool that includes a high pressure compressor and a high pressure turbine that is coupled through an outer shaft, a low spool that includes a low pressure turbine that is coupled to drive the fan section through an inner shaft, a high spool tower shaft that is coupled to the outer shaft, a low spool tower shaft that is coupled to the inner shaft, a constant speed drive that is driven at a variable input speed by at least one of the high spool tower shaft and the low spool tower shaft, the constant speed drive includes an output that rotates at a constant speed independent of the variable input speed, an accessory gearbox that includes a first gear system that is driven by the output of the constant speed drive, and at least one accessory component that is mounted to the accessory gearbox and driven by the first gear system.

In a further embodiment of the foregoing, the turbine engine assembly further includes a controller that is programmed to operate the constant speed drive to provide the constant speed of the output.

In a further embodiment of any of the foregoing, the turbine engine assembly further includes a heat exchanger that transfers heat that is generated within the constant speed drive into a cooling flow.

In a further embodiment of any of the foregoing, the turbine engine assembly further includes a combination gear system that is coupled to both the high spool tower shaft and the low spool tower shaft. The constant speed drive and the combination gear system are combined into a single integrated gearbox that drives the output.

In a further embodiment of any of the foregoing turbine engine assemblies, the constant speed drive is mounted to the accessory gearbox and drives a first gear system. The gearbox includes a second gear system that is coupled directly by one of the high spool tower shaft and the lower spool tower shaft that is separate from the constant speed drive and at least one accessory component that is driven by the second gear system.

In a further embodiment of any of the foregoing, the turbine engine assembly further includes a starter that is mounted to the gearbox and coupled to drive the one of the high spool tower shaft and the lower spool tower shaft that is directly coupled to the second gear system.

In a further embodiment of any of the foregoing turbine engine assemblies, the at least one accessory component includes at least one of a lubrication pump, fuel pump, hydraulic fluid pump and a generator.

A method of powering an accessory component of a turbine engine assembly according to another exemplary embodiment of this disclosure includes, among other possible things, coupling at least one tower shaft that is driven by an engine shaft to a constant speed drive, controlling operation of the constant speed drive to drive an output at a constant speed independent of a speed of the engine shaft, coupling the output of the constant speed drive to a gear system that is supported within an accessory gearbox, and driving at least one accessory component through the gear system.

In a further embodiment of the foregoing, the method further includes cooling the constant speed drive within a heat exchanger that is in thermal communication with a cooling flow.

In a further embodiment of any of the foregoing, the method further includes coupling a second gear system within the accessory gearbox to the at least one tower shaft to drive an accessory component directly and separate from the constant speed drive.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
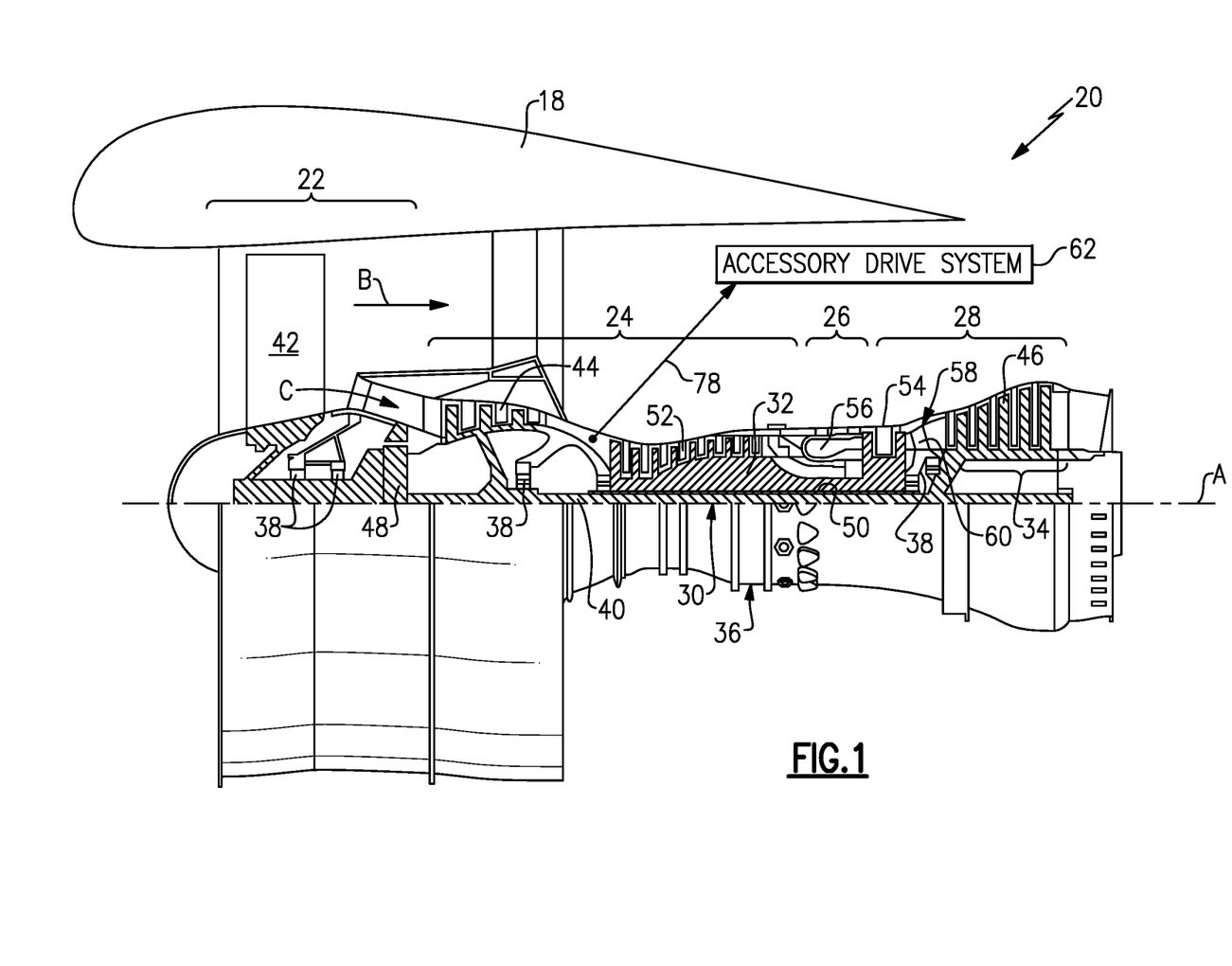
FIG. 1 is a schematic view of an example gas turbine engine including an accessory drive system.

FIG. 1 schematically illustrates a gas turbine engine 20 with an accessory drive system 62 that is driven by a tower shaft assembly 78 coupled to an engine shaft. The accessory drive system 62 includes a continuously variable transmission that drives accessory components at a constant speed independent of the speed of the tower shaft assembly 78.

The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, turbofans, turboprop, open rotor configurations and any other gas turbine engine architecture.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in the exemplary gas turbine engine 20 is illustrated as the fan drive gear system 48 to drive the fan section 22 at a lower speed than the low speed spool 30. The high speed spool 32 includes an outer shaft 50 that interconnects a second (or high) pressure compressor 52 and a second (or high) pressure turbine 54. The low pressure turbine 46 includes a plurality of turbine rotors 34. The tower shaft assembly 78 is engaged and driven by at least one of the inner shaft 40 and the outer shaft 50.

A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the fan drive gear system 48 may be located aft of the low pressure compressor 44, or aft of the combustor section 26 or even aft of turbine section 28, and fan section 22 may be positioned forward or aft of the fan drive gear system 48.

The engine 20 in one example is a high-bypass geared aircraft engine. the example engine 20 includes a bypass ratio greater than 20, with an example embodiment being greater than 32 and less than 72.

The fan drive gear system 48 is an epicycle gear train with a gear reduction ratio of greater than about 2:1 and less than about 18:1. In another example embodiment, the fan drive gear system 48 provides a gear reduction ratio of between 5:1 and 14:1. The gear system 48 is coupled to a fan shaft 74 to drive the fan section 22 about the engine axis A. It should be understood, however, that the above parameters are only exemplary of one embodiment of a geared engine architecture and that the present disclosure is applicable to other gas turbine engine architectures including turbofan, turboshaft, and open rotor engines.

Figure 2:
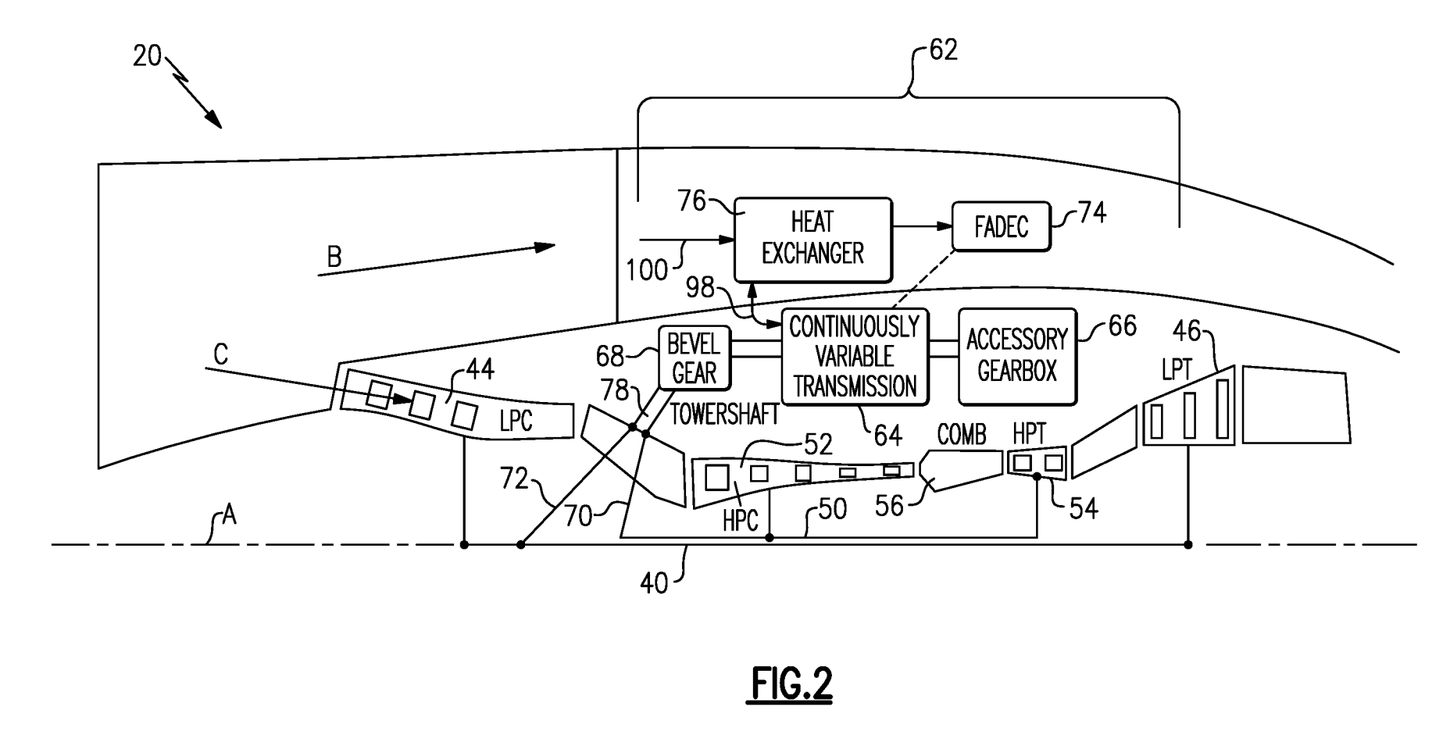
FIG. 2 is another schematic view the example gas turbine engine and accessory drive system.

Referring to FIG. 2 with continued reference to FIG. 1, the example accessory drive system 62 includes a constant speed drive that drives an accessory gearbox 66. The constant speed drive, in one example embodiment, is a continuously variable transmission (CVT) 64 that provides a drive input to the accessory gearbox 66 that rotates at a constant, or near constant speed. The example CVT 64 as described in this disclosure may include any system or assembly that provides a constant speed output independent of a varying speed of an input. For example, the CVT 64 may comprise a hydraulic drive, a mechanical drive or a combination of hydraulic and mechanical drive systems that are controlled to provide the desired constant speed output.

Although the CVT 64 is disclosed as providing a constant speed output to drive accessory components, the CVT 64 may be configured to provides an output speed that is near constant or within a narrow predefined range of speeds and remain within the contemplation and scope of this disclosure.

The CVT 64 is illustrated by example as being controlled by a FADEC 74 that controls operation of the engine 20. The FADEC 74 is an example of a controller that is programmed to operate the CVT 64 to provide the desired output speed. Although the FADEC 74 is disclosed by way of example, any control drive and system for performing necessary computing or calculation operations of the CVT 64 may be utilized and is within the contemplation and scope of this disclosure. A controller may be specially constructed for operation of the CVT 64, or it may comprise at least a general-purpose computer selectively activated or reconfigured by software instructions stored in a memory device. In this disclosed example, the controller is disclosed as part of a full authority digital engine control (FADEC) but may also be part of an electronic engine controller (EEC), or any other controller and/or control system utilized to control operation of the turbine engine 20 and/or aircraft.

A heat exchanger 76 is provided to maintain the CVT 64 within a predefined temperature range. The heat exchanger 76 may place a lubricant or hydraulic flow from the CVT 64 into thermal communication with a cooling flow 100 to provide heat transfer, schematically indicated at 98. In one disclosed example, the cooling flow 100 is the bypass air flow communicated through the bypass flow path B. Other flows that are capable of accepting heat may also be utilized and are within the contemplation of this disclosure. For example, fuel, lubricant, and hydraulic fluid flows may also be utilized to accept heat generated by the CVT 64.

Figure 3:
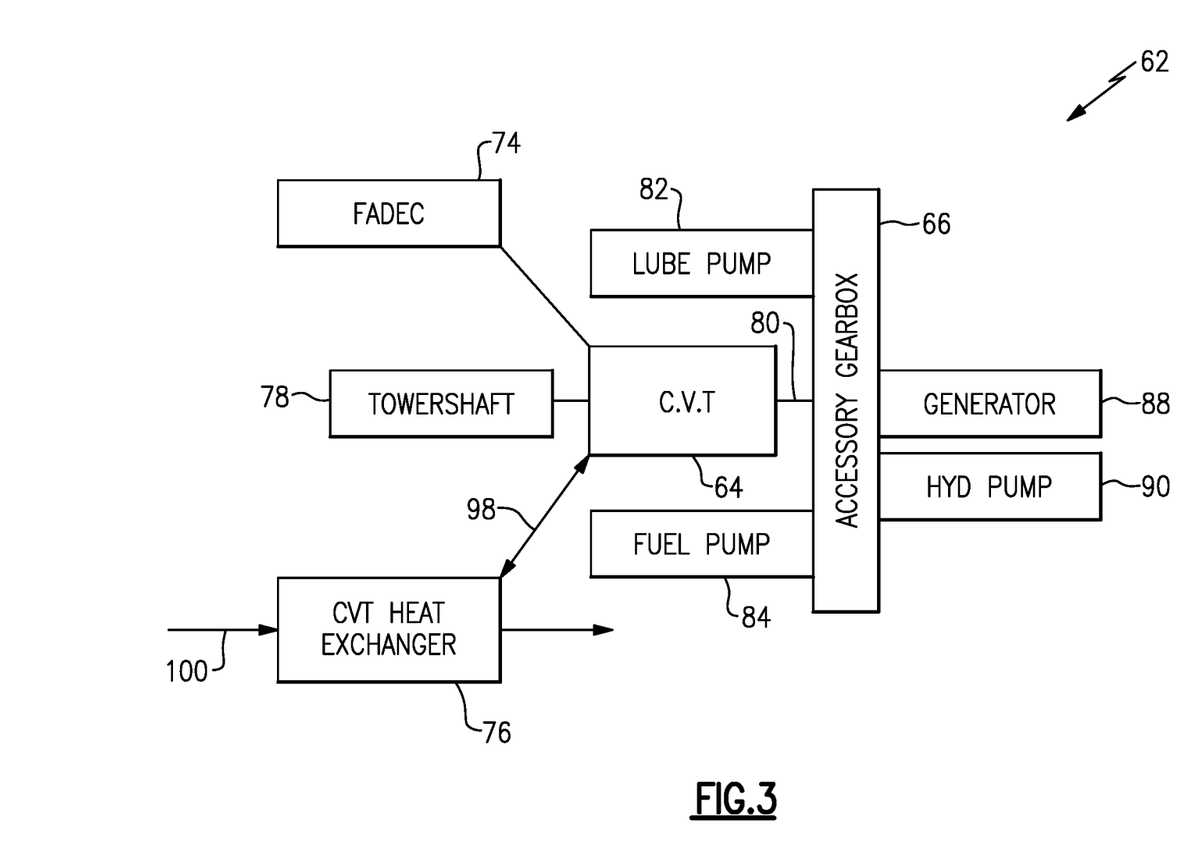
FIG. 3 is a schematic view of the example accessory drive system embodiment.

Referring to FIG. 3 with continued reference to FIG. 2, the example accessory drive system 62 is schematically shown and includes the CVT 64 that drives an output shaft 80 that drives accessory components mounted to the accessory gearbox 66. One of the tower shafts 70, 72 of the tower shaft system 78 provides an input to the CVT 64. The tower shaft system 78 is driven by one of the inner shaft 40 or the outer shaft 50. The high and low spool tower shafts 70, 72 rotate at a speed that varies with engine operation. The speed at which the inner and outer shafts 40, 50 operate may vary from a low idle speed to a very high speed at full power operating conditions.

Operation at widely different speeds requires that the accessory components are sized and configured to provide some minimum performance, even at the lowest idle speed conditions. However, the configuration that provides performance at the lowest idle speeds may have excess capacity and result in inefficiencies due to compromises made to provides a minimal level at all operating conditions. Accordingly, the CVT 64 enables the accessory devices to be configured to operate at a constant, or near constant speed.

In the example embodiment illustrated in FIG. 3, the CVT 64 drives the output shaft 80 at a constant, or near constant speed. The output shaft 80 from the CVT 64 drives the accessory gearbox 66 that supports operation of accessory components. The example accessory components include a lubrication pump 82, a fuel pump 84 a generator 88 and a hydraulic pump 90. The example accessory components are mounted to the accessory gear box 66. It should be appreciated that although several example accessory components are shown and disclosed by way of example, other and additional accessory components may be utilized and are within the scope and contemplation of this disclosure.

In this disclosed example, the CVT 64 is mounted separate from the accessory gearbox 66. The output shaft 80 extends from the CVT 64 to the accessory gear box 66. Accordingly, the drive input from the tower shaft assembly 78 may vary in speed over an operational cycle, but the speed of the output shaft 80 remains constant, or near constant. The constant, or near constant speed of the output shaft 80 enables configuration of the accessory components in a more efficient and advantageous manner.

Figure 4:
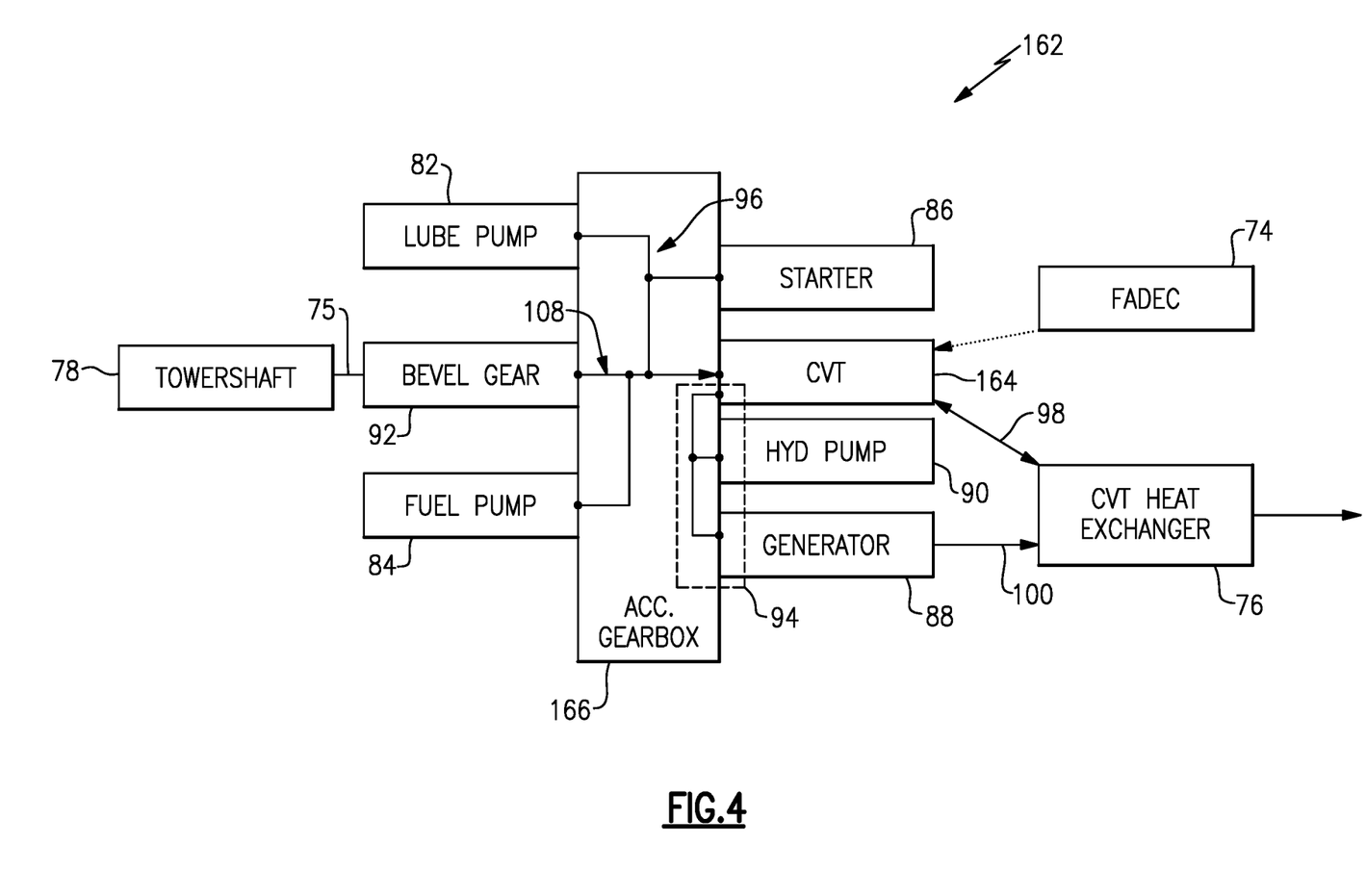
FIG. 4 is a schematic view of another example accessory drive system embodiment.

Referring to FIG. 4, with continued reference to FIG. 2, another accessory drive system 162 is schematically shown and includes a CVT 164 that is mounted directly to the accessory gearbox 166. The example accessory gearbox 166 includes a first gear system 94 and a second gear system 96. Both the first gear system 94 and the second gear system 96 are driven by a common input 108. The tower shaft assembly 78 drives a gear interface 92 through an output 75. The example gear interface 92 is a gear coupling that directs rotational drive from the engine shafts 40, 50 through the tower shaft assembly 78 to the accessory gearbox 166. As appreciated, rotational drive of the common input shaft 108 is turned from the engine axis A to a direction and location that corresponds with the mounting of the accessory gearbox 166. Accordingly, the gear interface 92 may be a bevel gear, a series of bevel gears or other drive connection that provides transmission along differing axes of rotation.

In one disclosed example embodiment, the common input 108 is a shaft that is coupled to drive both the CVT 64 and the second gear system 96. The first gear system 94 is driven by an output from the CVT 64. Accordingly, the first gear system 94 is operated at a constant, or substantially constant speed. In this example, the first gear system 94 drives the hydraulic pump 90 and the generator 88. The hydraulic pump 90 and the generator 88 are examples of accessory components that operate most efficiently at a constant speed and do not need to tailor output to current engine operation.

The second gear system 96 operates at a speed that varies with the speed of the common input 108. Moreover, the second gear system 96 is coupled to a starter 86 to enable driving of at least one of the engine shafts 40, 50 during starting operations. In this example embodiment, the lubrication pump 82 and the fuel pump 84 are driven by the second gear system 96. The lubrication pump 82 and the fuel pump 84 are examples of accessory components that vary operation to correspond to engine operating conditions and therefore variation of the input is acceptable and may provide benefits to engine operation.

Figure 5:
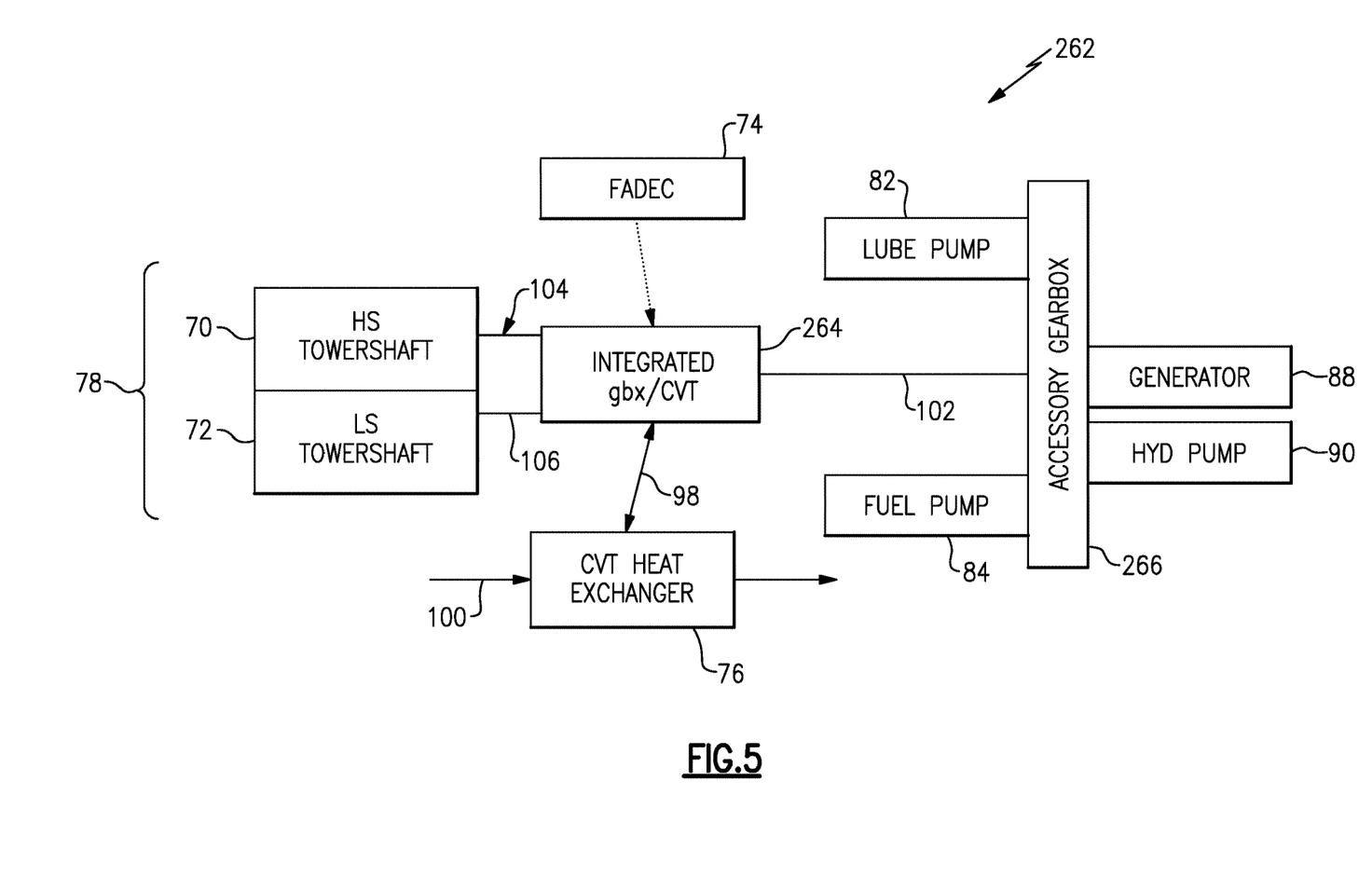
FIG. 5 is a schematic view of yet another example accessory drive system embodiment.

Referring to FIG. 5, with continued reference to FIG. 2, another example accessory drive system embodiment 262 is schematically shown and includes an integrated gear system and CVT 264. The integrated gear system and CVT 264 is coupled to both the high spool tower shaft 70 and the lower spool tower shaft 72. The high spool tower shaft 72 provides a first drive input 104 and the lower spool tower shaft 72 provides a second drive input 106 to the integrated gear system and CVT 264. The integrated gear system and CVT 264 provides an output 102 to drive an accessory gearbox 266. The output 102 is of a constant, or near constant speed independent of either of the inputs 104, 106.

The integrated gear system and CVT 264 provides a dual spool input architecture that enables the accessory gearbox 266 to be driven by either the high spool tower shaft 70, the low spool tower shaft 72, or some combination of both. The integrated gear system and CVT 264 is configured and controlled by the FADEC 74 to draw power from whichever spool is most advantageous at different phases of engine operation. The integrated gear system and CVT 264 may be configured to automatically draw power from one or both of the tower shafts 70, 72. Alternatively, the integrated gear system and CVT 264 may be configured to operate based on instructions from the FADEC 74 based on engine operating conditions or a predefined engine operating profile.

The disclosed accessory drive system provides a constant or near constant input speed to drive accessory components. The constant input speed enables configuration of each accessory component to operate within a limited speed range at increased efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An accessory drive system for a turbine engine comprising:
    a first input shaft coupled to a first engine drive shaft;
    a constant speed drive that is driven at an input speed by the first input shaft that varies, wherein the constant speed drive includes an output that rotates at a constant speed independent of the input speed;
    an accessory gearbox including a first gear system driven by the output from the constant speed drive; and
    a first accessory component mounted to the accessory gearbox and driven by the first gear system, wherein the constant speed drive is mounted to the accessory gearbox and drives the first gear system, wherein the accessory gearbox includes a second gear system that is driven directly by the first input shaft and separate from the constant speed drive;
    a controller programmed to operate the constant speed drive to provide the constant speed of the output; and
    a heat exchanger that transfers heat generated within the constant speed drive into a cooling flow.

2. The accessory drive system as recited in claim 1, wherein the first input shaft comprises a first tower shaft and the first engine shaft comprise an outer shaft of a high spool of the turbine engine.

3. The accessory drive system as recited in claim 2, further comprising a second tower shaft driven by an inner shaft of a low spool of the turbine engine and an integrated gear system that is coupled to both the first tower shaft and the second tower shaft, wherein the constant speed drive and the integrated gear system are combined into a single integrated gearbox that drives the output.

4. The accessory drive system as recited in claim 1, further comprising a starter that is mounted to the accessory gearbox and coupled to drive the input shaft through the second gear system.

5. The accessory drive system as recited in claim 1, wherein the first accessory component comprises at least one of a lubrication pump, fuel pump, hydraulic fluid pump and a generator.

6. A turbine engine assembly comprising:
    a fan section including a plurality of blades rotatable about an axis;
    a high spool including a high pressure compressor and a high pressure turbine coupled through an outer shaft;
    a low spool including a low pressure turbine coupled to drive the fan section through an inner shaft;
    a high spool tower shaft coupled to the outer shaft;
    a low spool tower shaft coupled to the inner shaft;
    a constant speed drive that is driven at a variable input speed by at least one of the high spool tower shaft and the low spool tower shaft, wherein the constant speed drive includes an output that rotates at a constant speed independent of the variable input speed;
    an accessory gearbox including a first gear system driven by the output of the constant speed drive and wherein the constant speed drive is mounted to the accessory gearbox;
    at least one first accessory component that is mounted to the accessory gearbox and driven by the first gear system; wherein the accessory gearbox includes a second gear system that is coupled directly by one of the high spool tower shaft and the low spool tower shaft separate from the constant speed drive and at least one second accessory component is driven by the second gear system; and
    a heat exchanger that transfers heat generated within the constant speed drive into a cooling flow.

7. The turbine engine assembly as recited in claim 6, further comprising a controller programmed to operate the constant speed drive to provide the constant speed of the output.

8. The turbine engine assembly as recited in claim 6, further comprising a combination gear system that is coupled to both the high spool tower shaft and the low spool tower shaft, wherein the constant speed drive and the combination gear system are combined into a single integrated gearbox that drives the output.

9. The turbine engine assembly as recited in claim 6, further comprising a starter that is mounted to the accessory gearbox and coupled to drive one of the high spool tower shaft and the low spool tower shaft directly coupled to the second gear system.

10. The turbine engine assembly as recited in claim 6, wherein the at least one second accessory component comprises at least one of a lubrication pump, and a fuel pump, and the at least one first accessory component comprises at least one of a hydraulic fluid pump and a generator.

11. A method of powering an accessory component of a turbine engine assembly comprising:
    coupling at least one tower shaft that is driven by an engine shaft to a constant speed drive;
    controlling operation of the constant speed drive to drive an output at a constant speed independent of a speed of the engine shaft;
    coupling the output of the constant speed drive to a gear system supported within an accessory gearbox;
    driving at least one accessory component through the gear system;
    coupling a second gear system within the accessory gearbox to the at least one tower shaft to drive an accessory component directly and separate from the constant speed drive; and
    cooling the constant speed drive within a heat exchanger in thermal communication with a cooling flow.

* * * * *